United States Patent [19]

Saji

[11] Patent Number: 5,501,052
[45] Date of Patent: Mar. 26, 1996

[54] TRIM MOUNTING STRUCTURE

[75] Inventor: Tomohide Saji, Hamamatsu, Japan

[73] Assignee: Suzuki Motor Corporation, Shizuoka, Japan

[21] Appl. No.: 261,736

[22] Filed: Jun. 17, 1994

[30] Foreign Application Priority Data

Sep. 30, 1993 [JP] Japan .................... 5-244135

[51] Int. Cl.⁶ .................................................. B60R 13/02
[52] U.S. Cl. ................... 52/716.5; 52/717.01; 296/218; 403/12; 403/13
[58] Field of Search ............... 52/716.5, 716.6, 52/716.7, 717.01, 717.05, 211, 718, 591.2, 211; 403/11, 12, 13; 296/218

[56] References Cited

U.S. PATENT DOCUMENTS

| | | | |
|---|---|---|---|
| 3,388,523 | 6/1968 | Evans | 52/716.5 |
| 4,229,036 | 10/1980 | Toda | 52/716.5 X |
| 4,475,766 | 10/1984 | McKee | 296/218 X |
| 4,606,159 | 8/1986 | Kunert | 52/716.5 X |
| 4,729,597 | 3/1988 | Fujihara et al. | 296/218 |
| 4,826,239 | 5/1989 | Nishikawa et al. | 296/218 |
| 4,914,882 | 4/1990 | Tamamushi et al. | 52/716.5 X |
| 5,252,376 | 10/1993 | Greenberg et al. | 52/716.6 X |
| 5,303,519 | 4/1994 | Mustee et al. | 52/717.01 X |

FOREIGN PATENT DOCUMENTS 210610  8/1960  Austria ................... 52/591.2

Primary Examiner—Carl D. Friedman
Assistant Examiner—Laura A. Saladino
Attorney, Agent, or Firm—Arnold, White & Durkee

[57] ABSTRACT

A claw-shaped protrusion is installed at the edge of one trim so that a forked portion is formed between the edge of the trim and the claw-shaped protrusion, a plurality of protrusions are formed at the edge of the other trim, and these trims are installed to the vehicle body in a condition where relative positioning between the trims is performed by inserting the edge of the other trim into the forked portion of one trim and abutting the side of the claw-shaped protrusion against the protrusions.

5 Claims, 7 Drawing Sheets

TRIM MOUNTING STRUCTURE

FIELD OF THE INVENTION AND RELATED ART STATEMENT

The present invention relates to a structure for mounting trim used as an interior part for a motor vehicle, etc, and, more particularly to a structure for mounting trim, which is suitable for the application to a split-type pillar trim for a T-bar roof type motor vehicle.

For a T-bar roof type motor vehicle in which a detachable roof can be installed detachably to an opening, a female (engagement hardware) for installing the detachable roof is normally disposed at each end of a front roof and a rear roof. By using the females, the detachable roof can be installed to the opening for the T-bar roof.

Specifically, for the T-bar roof type motor vehicle, a female for installing a detachable roof, which has an engagement hole, is disposed at the upper part of a pillar portion, and a shaft corresponding to the engagement hole of the female is mounted to the detachable roof covering the opening for the T-bar roof. Therefore, the detachable roof can be attached to the opening for the T-bar roof and can be supported by inserting the shaft of the detachable roof into the engagement hole of the female so that the shaft engages with the engagement hole.

The aforementioned female is normally covered by pillar trim, which is an interior part of the pillar portion, in order not to impair the appearance of the cabin interior. Therefore, the detachable roof is actually attached by engaging the shaft of the detachable roof with the engagement hole of the female through a shaft insertion hole formed in pillar trims (front pillar trim and rear pillar trim).

To readjust the installation position of the detachable roof, it is necessary to adjust the installation position of the female. In performing this adjustment work, the pillar trim must be removed from the pillar portion of the vehicle body. In order to facilitate this removal work, it is convenient to construct the pillar trim 30 in such a manner that, as shown in FIG. 12, only the upper portion corresponding to the installation position of the female, which is a part of the pillar trim 30, is constituted as pillar upper trim 30*b*, a separate member separated from the pillar trim body 30*a*, and a shaft insertion hole 31 is formed in the pillar upper trim 30*b* so that the readjustment work of the female can be performed by independently removing the pillar upper trim 30*b*.

In this case, an installation construction of the pillar upper trim 30*b* can be thought such that position control (positioning) vertical and longitudinal with respect to the vehicle body, as indicated by arrows X and Z in FIG. 13, is performed by simply joining the pillar upper trim 30*b* to the pillar trim body 30*a* in a plane as shown in FIG. 13, and the pillar upper trim 30*b* is screwed in the pillar portion of the vehicle body with a tapping screw 33 by using a screw insertion hole 32 of the pillar upper trim 30*b*.

However, when the installation construction shown in FIGS. 12 and 13 is used, in assembling the pillar upper trim 30*b*, the worker must hold the pillar upper trim 30*b* at a predetermined position by hand until the pillar upper trim 30*b* is fastened with the tapping screw 33. This holding work is troublesome.

Because the edge of the pillar upper trim 30*b* and the edge of the pillar trim body 30*a* are joined in a plane as shown in FIG. 13, when the pillar upper trim 30*b* is assembled to the pillar trim body 30*a* before being screwed with the tapping screw 33, the position control in the vehicle width direction (the direction indicated by the arrow Y in FIG. 12, or the direction perpendicular to the paper in FIG. 13) is not performed, and additionally the position control vertical with respect to the vehicle body is insufficient. Therefore, it is difficult to hold the pillar upper trim 30*b* at the correct assembling position.

OBJECT AND SUMMARY OF THE INVENTION

The present invention was made to solve the above problems. Accordingly, an object of the present invention is to provide a trim mounting structure constructed so that when one trim (for example, a pillar upper trim) is assembled to the other trim (for example, a pillar trim body), the need for holding work for the time until one trim is assembled and screwed to the other trim is eliminated, and these trims can be positioned easily and accurately in any direction: vehicle width direction, vertical direction of the vehicle body, and longitudinal direction of the vehicle body.

To achieve the above object, according to the present invention, the trim mounting structure is constituted so that a claw-shaped protrusion is installed at the edge of one trim so that a forked portion is formed between the edge of the trim and the claw-shaped protrusion, a plurality of protrusions are formed at the edge of the other trim, and these trims are installed to the vehicle body in a condition where relative positioning between the trims is performed by inserting the edge of the other trim into the forked portion of one trim and abutting the side of the claw-shaped protrusion against the protrusions.

Also, according to the present invention, the one trim and the other trim are members composing a pillar trim of a T-bar roof type motor vehicle, and the one trim or the other trim is a member for covering a female for mounting a detachable roof at the upper part of the pillar trim.

According to the above constitution in accordance with the present invention, the positioning (position control) of the trims to be assembled is performed in the vehicle width direction, the vertical direction of the vehicle body, and the longitudinal direction of the vehicle body by means of the engaging construction between the forked portion formed on one trim and a plurality of protrusions formed on the other trim and the abutting construction between the claw-shaped protrusion of the forked portion and the protrusion. Therefore, the trims to be assembled can be fixed temporarily when being installed, so that the need for the work of holding the trim for the time from assembling to screwing can be eliminated, by which the trim assembling work is made easy.

DETAILED DESCRIPTION OF PREFERRED EMBODIMENTS

An embodiment of the present invention will be described below with reference to FIGS. 1 to 11.

Figure 1:
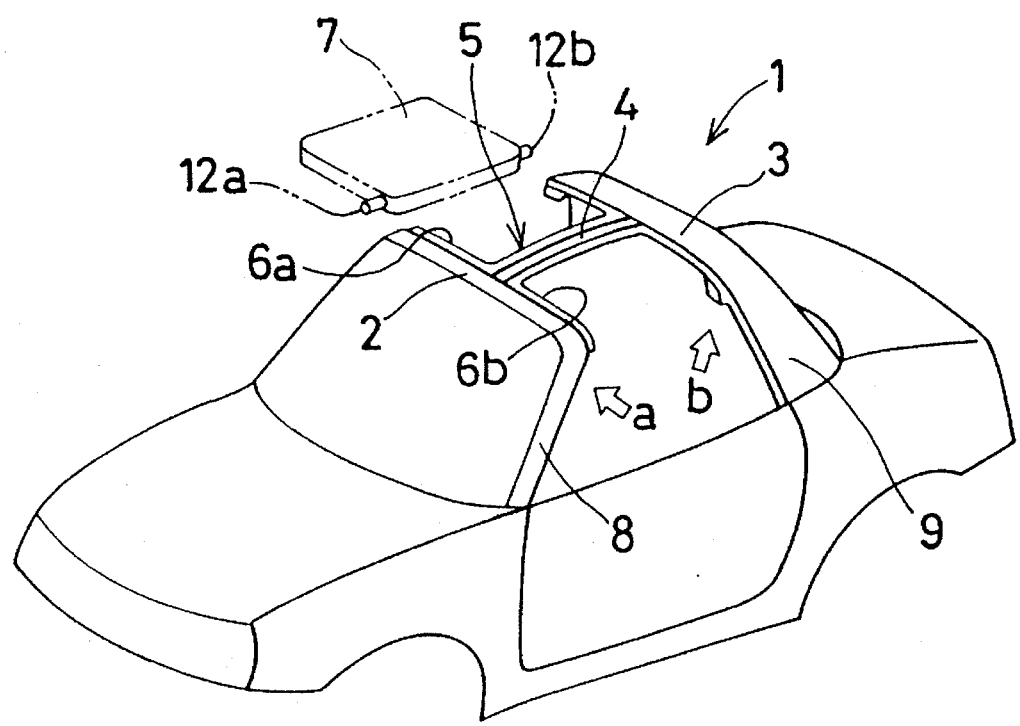
FIG. 1 is a perspective view of a T-bar roof type motor vehicle including a trim mounting structure in accordance with the present invention.

FIG. 1 shows a T-bar roof type motor vehicle. The T-bar roof type motor vehicle includes what we call a T-bar roof (sometimes merely called a T roof) of a T shape, which consists of a front roof 2 or a rear roof 3 extending along the vehicle width direction and a central roof 4 connected between substantially middle portions of the roofs 2 and 3. The roof portion defined by this T-bar roof forms a pair of right and left U-shaped openings 6a and 6b. Detachable roofs 7 covering these openings 6a and 6b are mounted detachably.

Figure 2:
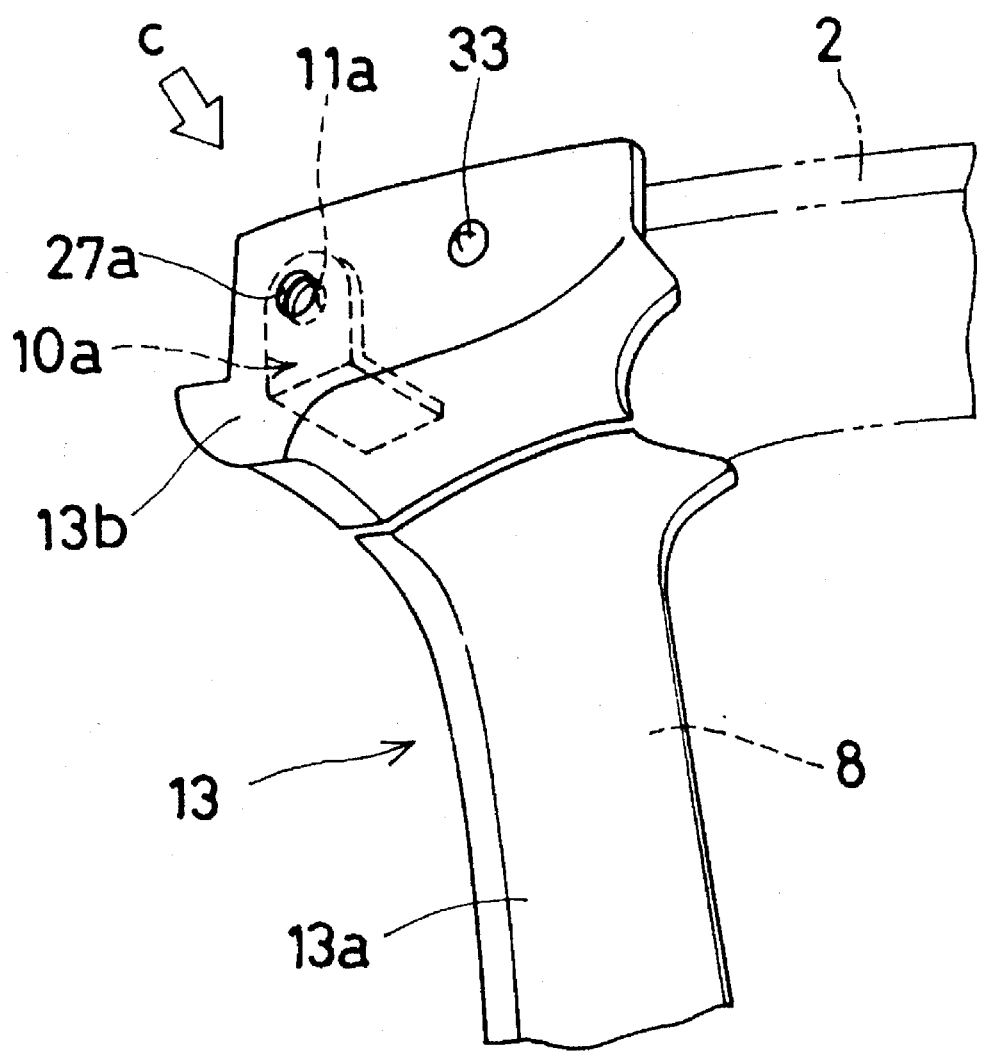
FIG. 2 is a perspective view of front pillar trim viewed in the direction indicated by the arrow a in FIG. 1.
Figure 3:
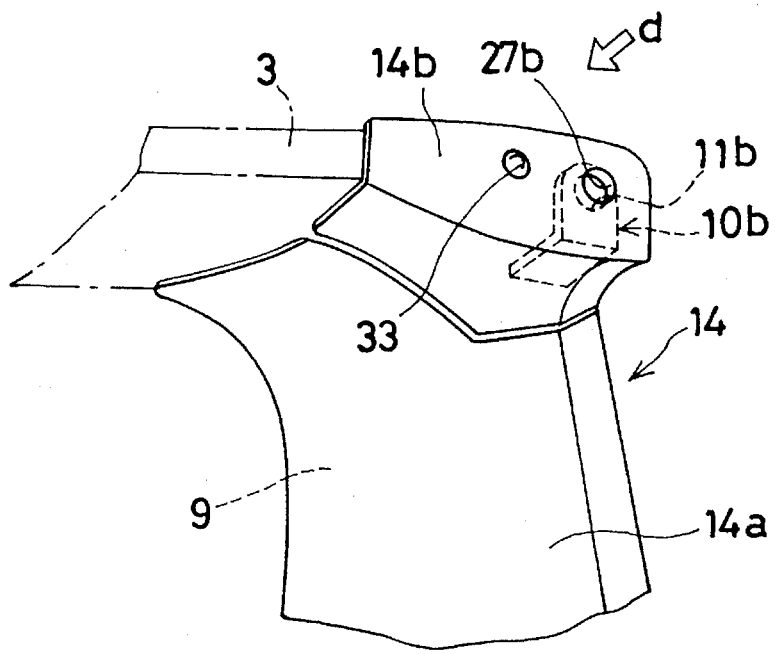
FIG. 3 is a perspective view of rear pillar trim viewed in the direction indicated by the arrow b in FIG. 1.

The aforementioned detachable roofs 7 are mounted to the openings 6a and 6b, respectively, by engaging a pair of shafts 12a and 12b installed to the detachable roof 7 with engagement holes 11a and 11b in females 10a and 10b for mounting the detachable roof, which are located at the side portion of the front roof 2 and the rear roof 3 and at the upper portion of a front pillar 8 and a rear pillar 9, respectively (see FIGS. 2 and 3).

The females 10a and 10b for mounting the detachable roof are, as shown in FIGS. 2 and 3, bolted to the vehicle body portions above the front pillar 8 and the rear pillar 9, and covered by front pillar trim 13 installed inside the front pillar 8 and rear pillar trim 14 installed inside the rear pillar 9, respectively, to improve the appearance.

In this embodiment, the portions which are the upper parts of the aforementioned front pillar trim 13 and rear pillar trim 14 and correspond to the places where the aforementioned females 10a and 10b are mounted are constructed by separated members which are separated from the pillar trim body. Specifically, the front pillar trim 13 is composed of a pillar trim body 13a and a separate pillar upper trim 13b which is assembled to the upper part of the pillar trim body 13a. Likewise, the rear pillar trim 14 is composed of a pillar trim body 14a and a separate pillar upper trim 14b which is assembled to the upper part of the pillar trim body 14a.

After being installed to the vehicle body, the aforementioned females 10a and 10b are concealed by the pillar upper trims 13b and 14b, respectively, to improve the appearance of the vehicle cabin. When it is necessary to readjust the installation position of the detachable roofs 7 in the openings 6a and 6b of the T-bar roof, only the pillar upper trims 13b and 14b can be singly removed from the pillar trims 13a and 14a and the vehicle body.

Next, the construction of the connecting part of the pillar trim body 13a and the pillar upper trim 13b of the front pillar trim 13 will be described.

Figure 4:
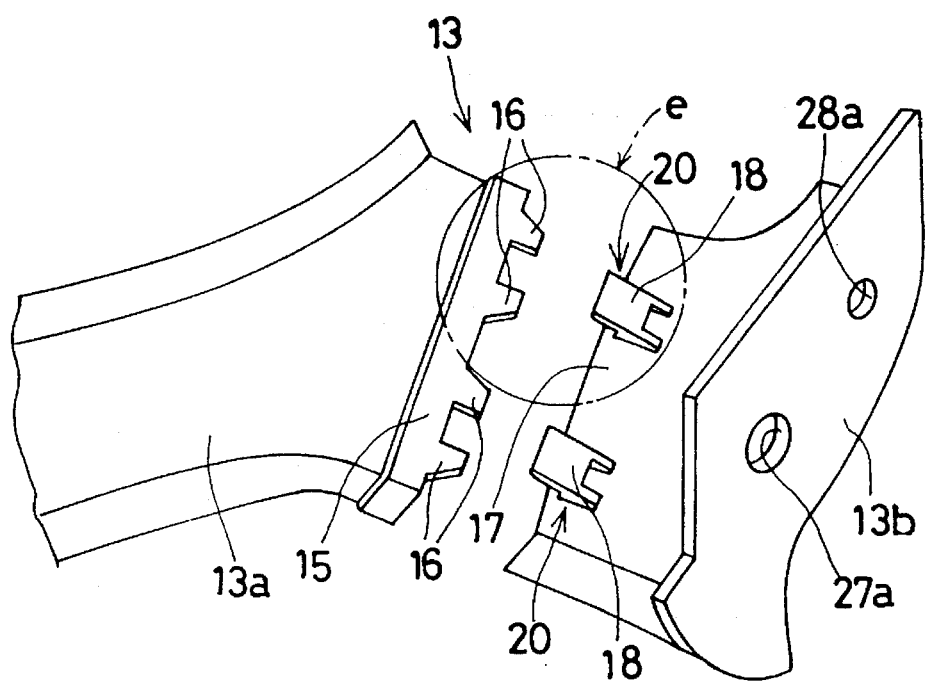
FIG. 4 is a perspective view of the disassembled front pillar trim viewed in the direction indicated by the arrow c in FIG, 2.
Figure 6:
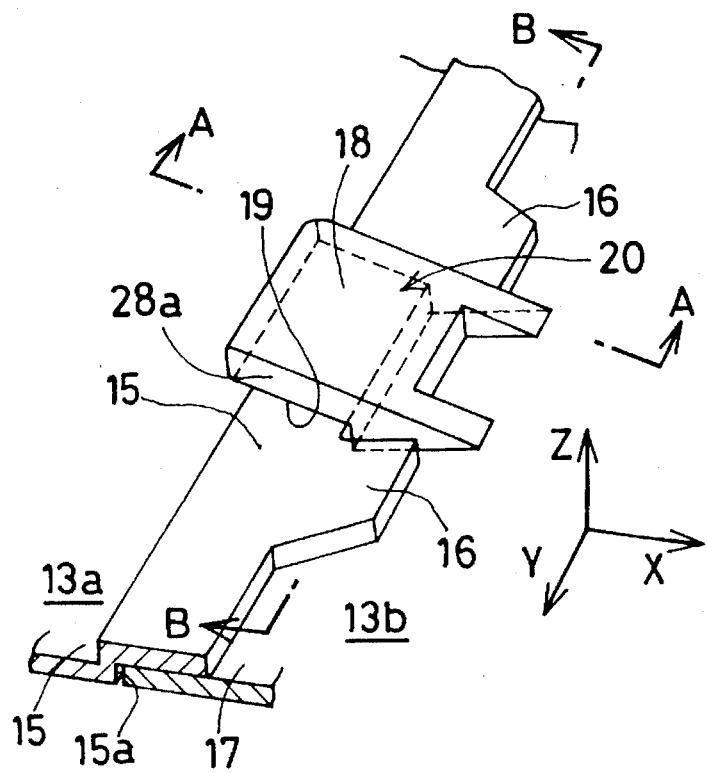
FIG. 6 is a perspective view of the assembling portion indicated by character e in FIG. 4.
Figure 8:
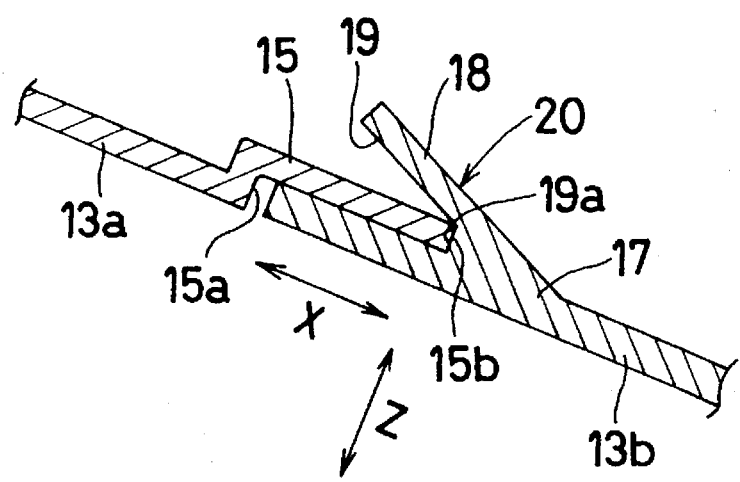
FIG. 8 is a sectional view taken along the line A—A of FIG. 6.

As shown in FIG. 4, the connection edge of the pillar trim body 13a is formed in a serrated shape, and four protrusions 16 are integrally formed at predetermined positions in the connecting direction (direction of the face of the pillar trim body 13a). The connection edge 15 is provided with a step portion 15a corresponding to the plate thickness of the pillar upper trim 13b as shown in FIGS. 6 and 8. On the other hand, at the inside of the connection edge 17 of the pillar upper trim 13b, two claw-shaped protrusions 18 are integrally formed at predetermined positions, which protrude from the connection edge 17 in the direction intersecting with respect to the connecting direction. Thus, a forked portion 20 having a concave 19 of a substantially V shape in cross section is formed by the connection edge 17 and the claw-shaped protrusion 18 opposed to the connection edge 17 as shown in FIG. 8. The distance between two paired protrusions 16 is almost equal to the width of the claw-shaped protrusion 18.

Figure 5:
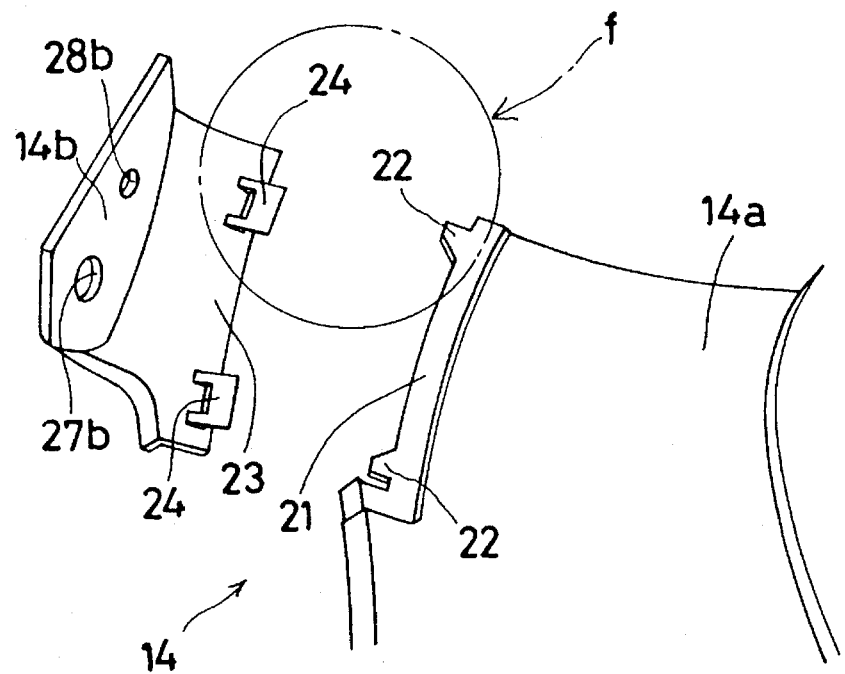
FIG. 5 is a perspective view of the disassembled rear pillar trimed viewed in the direction indicated by the arrow d in FIG. 3.
Figure 7:
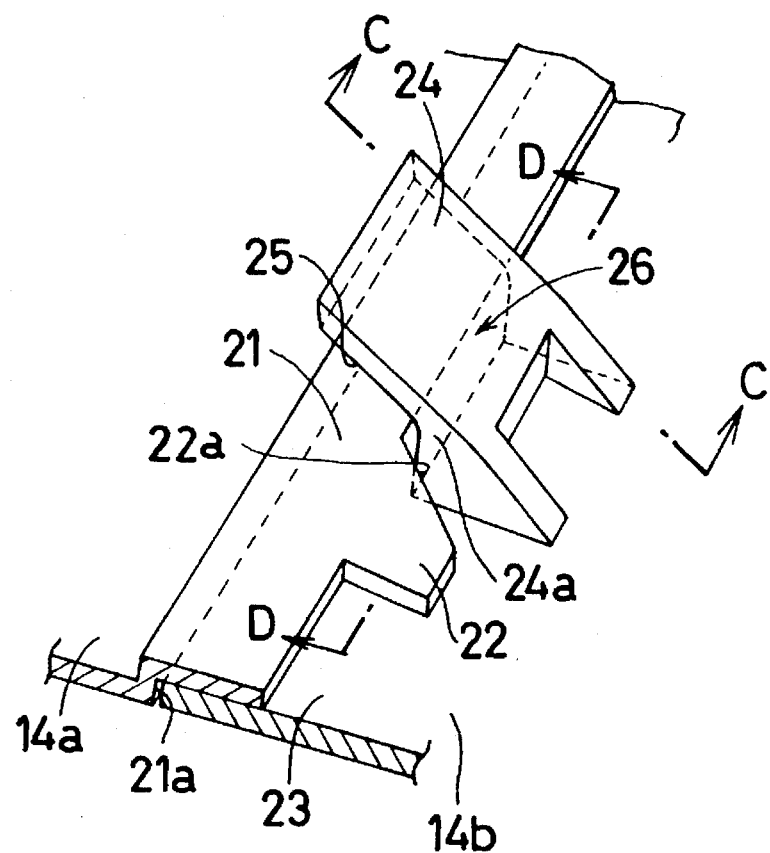
FIG. 7 is a perspective view of the assembling portion indicated by character f in FIG. 5.
Figure 10:
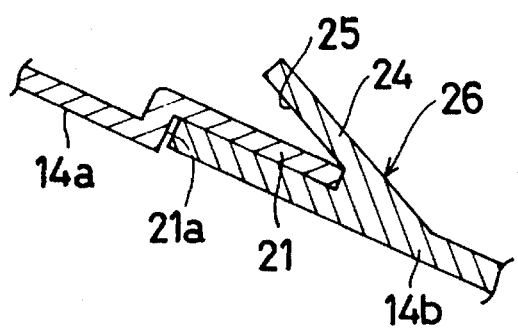
FIG. 10 is a sectional view taken along the line C—C of FIG. 7.

The construction of the connecting part of the pillar trim body 14a and the pillar upper trim 14b of the rear pillar trim 14 is similar to the construction for the front pillar trim 13. Specifically, as shown in FIG. 5, two protrusions 22 are integrally formed at the connection edge 21 of the pillar trim body 14a, and two claw-shaped protrusions 24 are integrally formed at the inside of the connection edge 23 of the pillar upper trim 14b. The connection edge 21 is provided with a step portion 21a corresponding to the plate thickness of the pillar upper trim 14b as shown in FIGS. 7 and 10. Thus, a forked portion 26 having a concave 25 of a substantially V shape in cross section is formed by the connection edge 23 and the claw-shaped protrusion 24 opposed to the connection edge 23 as shown in FIG. 10. The inside distance between two protrusions 22 and 22 in the width direction is almost equal to the outside distance between the claw-shaped protrusions 24 and 24 in the width direction.

As shown in FIGS. 4 and 5, the pillar upper trims 13b and 14b are provided with shaft insertion holes 27a and 27b for inserting the shafts 12a and 12b of the detachable roof 7 and screw insertion holes 28a and 28b for inserting tapping screws 33 for mounting the pillar upper trims, respectively.

Next, the installation work for installing the front pillar trim 13 and the rear pillar trim 14 to the vehicle body will be described. First, the pillar trim bodies 13a and 14b are installed to the front pillar 8 and the rear pillar 9 in advance, and then the pillar upper trims 13b and 14b are assembled to the installed pillar trim bodies 13a and 14a, respectively.

Figure 9:
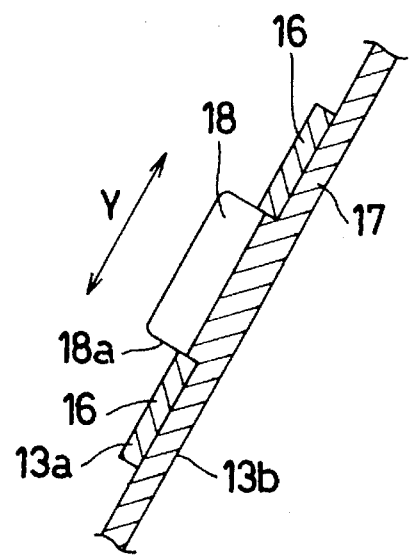
FIG. 9 is a sectional view taken along the line B—B of FIG. 6.

In assembling the pillar upper trim 13b, the part between the paired protrusions 16 and 16, which is a part of the connection edge 15 of the pillar trim body 13a, is inserted into the concave 19 disposed in the pillar upper trim 13b as shown in FIGS. 6 and 8. The tip end 15b of the connection edge 15 is abutted against the innermost surface 19a of the concave 19 of the pillar upper trim 13b as shown in FIG. 8. Therefore, as shown in FIG. 9, the sides of the paired protrusions 16 of the pillar trim body 13a are in contact with both sides 18a of the claw-shaped protrusion 18 of the pillar upper trim 13b, so that the claw-shaped protrusion 18 is held between the paired protrusions 16.

As a result, the position control of the pillar upper trim 13b with respect to the pillar trim body 13a in the direction indicated by the arrow X (see FIGS. 6 and 8), that is, the vertical direction of the vehicle body, is performed by inserting the connection edge 15 of the pillar trim body 13a between the connection edge 17 and the claw-shaped protrusion 18 and abutting the tip end 15b against the innermost surface 19a of the concave 19.

Further, the position control of the pillar upper trim 13b with respect to the pillar trim body 13a in the direction indicated by the arrow Y (see FIGS. 6 and 9), that is, the vehicle width direction, is performed by holding the connection edge 15 between the connection edge 17 and the claw-shaped protrusion 18.

Still further, the position control of the pillar upper trim 13b with respect to the pillar trim body 13a in the direction indicated by the arrow Z (see FIGS. 6 and 8), that is, the longitudinal direction of the vehicle body, is performed by holding the claw-shaped protrusion 18 of the pillar upper trim 13b between the paired protrusions 16 and 16 of the pillar trim body 13a.

In this embodiment, therefore, the vertical, lateral, and longitudinal position control of the pillar upper trim 13b with respect to the pillar trim body 13a, which has been installed to the front pillar 8 in advance, can be performed, so that the pillar upper trim 13b can be assembled to the trim body 13a with the relative movements in all directions being inhibited. Therefore, by merely assembling the pillar upper trim 13b to the pillar trim body 13a, the pillar upper trim 13b is held in a temporarily fixed condition, so that it is unnecessary for the worker to hold the pillar upper trim 13b by hand for the time from the assembly of the pillar upper trim 13b to the installation thereof to the vehicle body.

After the pillar upper trim 13b is assembled to the pillar trim body 13a in a temporarily fixed condition as described above, the pillar upper trim 13b is screwed to the vehicle body with a tapping screw 33 by using the screw insertion hole 28a of the pillar upper trim 13b. Thus, one front pillar trim 13 is formed with the pillar trim body 13a and the pillar upper trim 13b being combined with each other, and fixedly arranged on the inside of the front pillar 8. The joint portion of the pillar trim body 13a and the pillar upper trim 13b is flush due to the presence of the step portion 15a, which provides a smooth, flat appearance.

Figure 11:
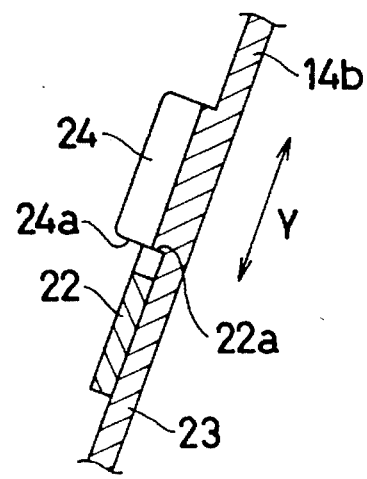
FIG. 11 is a sectional view taken along the line D—D of FIG. 7.
Figure 12:
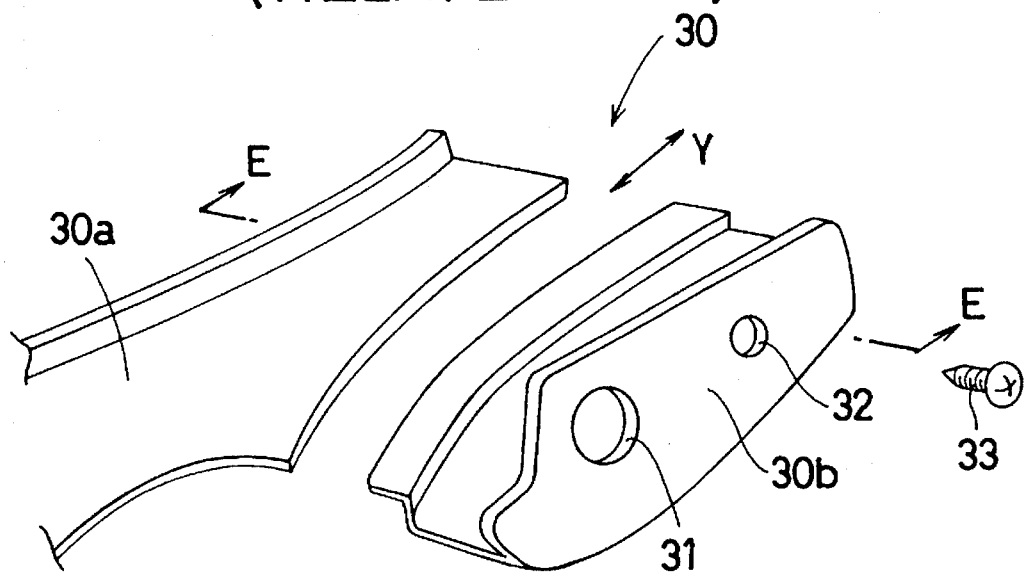
FIG. 12 is an exploded perspective view showing a conventional trim mounting structure.
Figure 13:
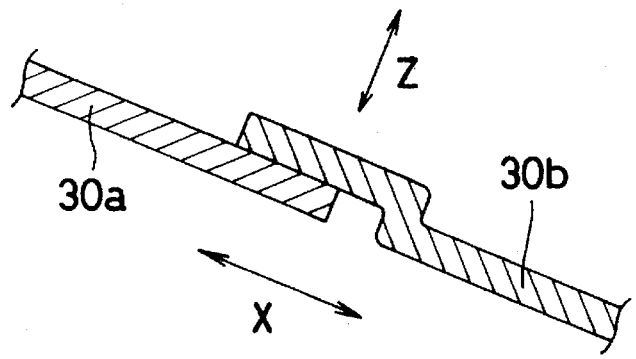
FIG. 13 is a sectional view taken along the line E—E of FIG. 12.

The rear pillar trim 14 is installed in substantially the same manner as the aforementioned case of the front pillar trim 13, as shown in FIGS. 7, 10, and 11. For the rear pillar trim 14, however, the one side 24a of one claw-shaped protrusion 24 of the pillar upper trim 14b is abutted against the side 22a of one protrusion 22 of the pillar trim body 14a, and the other claw-shaped protrusion 24 is abutted against the other protrusion 22 at the place on the opposite side. In this case too, position control is performed not only in the direction indicated by the arrow Y (vehicle width direction) but also in the direction indicated by the arrow X (vertical direction of the vehicle body) and the arrow Z (longitudinal direction of the vehicle body) because the paired right and left claw-shaped protrusions 24 and 24 are held between the paired right and left protrusions 22 and 22.

With such a trim mounting structure, the pillar upper trims 13b and 14b are assembled to and temporarily fixed to the pillar trim body 13a and 14a while their positions are controlled exclusively in any direction, so that the screwing work of the pillar upper trims 13b and 14b to the vehicle body can be performed easily and efficiently. Even if the pillar upper trims 13b and 14b are removed by loosening the screws in order to readjust the installation position of the detachable roof 7, the pillar upper trims 13b and 14b are held in the temporarily fixed condition, so that there is no possibility that the pillar upper trim 13b and/or 14b come off unexpectedly.

Although one embodiment of the present invention has been described above, the present invention is not limited to the above embodiment, and various changes and modifications may be made in light of the above teachings. For example, the shape and construction of the protrusions 16 and 22, the claw-shaped protrusions 18 and 24, the forked portions 20 and 26, etc. may be changed variously if necessary.

In contrast with the above embodiment, the pillar trim bodies 13a and 14a may be provided with forked portions 20 and 26 by installing the claw-shaped protrusions 18 and 24, whereas the pillar upper trims 13b and 14b may be provided with the protrusions 16 and 22.

Although the present invention has been applied to the front and rear pillar trims 13 and 14 in the above embodiment, it is obvious that the present invention can be applied to various trims other than the pillar trims.

As described above, according to the present invention, the edge of one trim is inserted into the forked portions formed on the other trim, and these trims are combined with the protrusions of one trim being abutted against the sides of the claw-shaped protrusions composing the forked portions in order to install the trims to the vehicle body. Therefore, the trims can be assembled easily in such a manner that the position control of one trim with respect to the other trim is performed in all directions: vehicle width direction, vertical direction of the vehicle body, and longitudinal direction of the vehicle body, and one trim can be surely held in a temporarily fixed condition without relative movement with respect to the other trim by merely performing assembly. This decreases the manpower for assembly, and eliminates the need for the worker to hold the trim at the assembling position for the time from the completion of trim assembly to the start of trim installation, by which the trim installation work can be performed easily and efficiently.

For T-bar roof type motor vehicles, the installation position of the detachable roof can be conveniently readjusted by adjusting the installation position of the female for mounting the detachable roof by merely removing only one trim covering the female for mounting the detachable roof. In addition, in removing one trim covering the female, the temporarily fixed condition is held when one trim is removed from the vehicle body, so that a work trouble such that one trim comes off unexpectedly can be avoided.

I claim:

1. A T-bar roof trim mounting structure connecting first and second pillar trims of a T-bar roof on a vehicle body, one of said first and second trims covering a mounting of the T-bar roof on the vehicle body, said mounting structure comprising a claw-shaped protrusion installed at an edge of the first trim so that a forked portion is formed between the edge of said first trim and said claw-shaped protrusion, a plurality of protrusions are formed at an edge of the second trim, and these trims are installed to the vehicle body in a condition where relative positioning between said trims is performed by inserting the edge of the second trim into said forked portion of the first trim and abutting sides of said claw-shaped protrusion against said protrusions, said forked portion being V-shaped in cross-section to facilitate easy engagement between said first and second trims.

2. The mounting structure of claim 1 wherein said forked portion includes said claw-shaped protrusion, a lower piece, and a base where said protrusion and said piece converge, said second trim being offset to engage the lower piece of said forked portion.

3. The mounting structure of claim 2 wherein at least some of said protrusions on said second trim are spaced from one another by a distance substantially corresponding to the width of said claw-shaped protrusion.

4. The mounting structure of claim 3 wherein said first and second trims are positioned with respect to one another such that gravity biases said second trim into contact with said first trim at the base of said forked portion, the weight of said second trim biasing said second trim against said claw-shaped protrusion.

5. The mounting structure of claim 4 wherein the lower piece includes a free end situated such that a gap is created between the lower piece free end and said second trim.

* * * * *